(12) United States Patent
Yan et al.

(10) Patent No.: US 8,494,253 B2
(45) Date of Patent: Jul. 23, 2013

(54) THREE-DIMENSIONAL (3D) IMAGE PROCESSING METHOD AND SYSTEM

(75) Inventors: Fei Yan, Shenzhen (CN); Ning Liu, Shenzhen (CN); Tongfu Li, Shenzhen (CN); Yakui Li, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 441 days.

(21) Appl. No.: 12/892,028

(22) Filed: Sep. 28, 2010

(65) Prior Publication Data
US 2012/0008853 A1     Jan. 12, 2012

(30) Foreign Application Priority Data
Jul. 7, 2010   (CN) .......................... 2010 1 0230502

(51) Int. Cl.
*G06K 9/36* (2006.01)
(52) U.S. Cl.
USPC .......................................... 382/154

(58) Field of Classification Search
None
See application file for complete search history.

(56) References Cited

U.S. PATENT DOCUMENTS

| | | | | | |
|---|---|---|---|---|---|
| 5,483,351 | A | * | 1/1996 | Mailloux et al. | 358/3.27 |
| RE38,933 | E | * | 1/2006 | Mayer et al. | 348/43 |
| 2010/0171814 | A1 | * | 7/2010 | Routhier et al. | 348/46 |

* cited by examiner

*Primary Examiner* — Brian P Werner
(74) *Attorney, Agent, or Firm* — Anova Law Group, PLLC

(57) ABSTRACT

A three-dimensional (3D) image processing method is provided. The method includes receiving from an image source a 3D image containing compressed first image pixel data and compressed second image pixel data, and storing the received compressed first image pixel data and compressed second image pixel data in a line register group. The method also includes determining a relationship between lines of the compressed first image pixel data and compressed second image pixel data, and using reading and writing operations on the line register group based on the relationship and a predetermined timing sequence to decompress the compressed first image pixel data and compressed second image pixel data.

18 Claims, 4 Drawing Sheets

| Left L.N. | Reference Data Original L.N. | | | | Right L.N. | Reference Data Original L.N. | | | |
|---|---|---|---|---|---|---|---|---|---|
| 0 | 0 | 0 | 0 | 2 | | | | | |
| 1 | 0 | 0 | 2 | 4 | 0 | 1 | 1 | 1 | 3 |
| 2 | 0 | 0 | 2 | 4 | 1 | 1 | 1 | 3 | 5 |
| 3 | 0 | 2 | 4 | 6 | 2 | 1 | 1 | 3 | 5 |
| 4 | 0 | 2 | 4 | 6 | 3 | 1 | 3 | 5 | 7 |
| 5 | 2 | 4 | 6 | 8 | 4 | 1 | 3 | 5 | 7 |
| 6 | 2 | 4 | 6 | 8 | 5 | 3 | 5 | 7 | 9 |
| 7 | 4 | 6 | 8 | 10 | 6 | 3 | 5 | 7 | 9 |
| 8 | 4 | 6 | 8 | 10 | 7 | 5 | 7 | 9 | 11 |
| 9 | 6 | 8 | 10 | 12 | 8 | 5 | 7 | 9 | 11 |
| 10 | 6 | 8 | 10 | 12 | 9 | 7 | 9 | 11 | 13 |
| 11 | 8 | 10 | 12 | 14 | 10 | 7 | 9 | 11 | 13 |
| 12 | 8 | 10 | 12 | 14 | 11 | 9 | 11 | 13 | 15 |
| 13 | 10 | 12 | 14 | 16 | 12 | 9 | 11 | 13 | 15 |
| 14 | 10 | 12 | 14 | 16 | 13 | 11 | 13 | 15 | 17 |
| 15 | 12 | 14 | 16 | 18 | 14 | 11 | 13 | 15 | 17 |
| 16 | 12 | 14 | 16 | 18 | 15 | 13 | 15 | 17 | 19 |
| 17 | 14 | 16 | 18 | 20 | 16 | 13 | 15 | 17 | 19 |
| 18 | 14 | 16 | 18 | 20 | 17 | 15 | 17 | 19 | 21 |
| 19 | 16 | 18 | 20 | 22 | 18 | 15 | 17 | 19 | 21 |
| 20 | 16 | 18 | 20 | 22 | 19 | 17 | 19 | 21 | 23 |
| 21 | 18 | 20 | 22 | 24 | 20 | 17 | 19 | 21 | 23 |
| 22 | 18 | 20 | 22 | 24 | 21 | 19 | 21 | 23 | 25 |
| 23 | 20 | 22 | 24 | 26 | 22 | 19 | 21 | 23 | 25 |
| 24 | 20 | 22 | 24 | 26 | 23 | 21 | 23 | 25 | 27 |
| 25 | 22 | 24 | 26 | 28 | 24 | 21 | 23 | 25 | 27 |
| 26 | 22 | 24 | 26 | 28 | 25 | 23 | 25 | 27 | 29 |
| 27 | 24 | 26 | 28 | 30 | 26 | 23 | 25 | 27 | 29 |
| 28 | 24 | 26 | 28 | 30 | 27 | 25 | 27 | 29 | 31 |
| 29 | 26 | 28 | 30 | 32 | 28 | 25 | 27 | 29 | 31 |
| 30 | 26 | 28 | 30 | 32 | 29 | 27 | 29 | 31 | 33 |
| 31 | 28 | 30 | 32 | 34 | 30 | 27 | 29 | 31 | 33 |
| 32 | 28 | 30 | 32 | 34 | 31 | 29 | 31 | 33 | 35 |
| 33 | 30 | 32 | 34 | 36 | 32 | 29 | 31 | 33 | 35 |
| 34 | 30 | 32 | 34 | 36 | 33 | 31 | 33 | 35 | 37 |
| 35 | 32 | 34 | 36 | 38 | 34 | 31 | 33 | 35 | 37 |
| 36 | 32 | 34 | 36 | 38 | 35 | 33 | 35 | 37 | 39 |
| 37 | 34 | 36 | 38 | 40 | 36 | 33 | 35 | 37 | 39 |
| 38 | 34 | 36 | 38 | 40 | 37 | 35 | 37 | 39 | 41 |
| 39 | 36 | 38 | 40 | 42 | 38 | 35 | 37 | 39 | 41 |
| 40 | 36 | 38 | 40 | 42 | 39 | 37 | 39 | 41 | 43 |
| 41 | 38 | 40 | 42 | 44 | 40 | 37 | 39 | 41 | 43 |
| 42 | 38 | 40 | 42 | 44 | 41 | 39 | 41 | 43 | 45 |
| 43 | 40 | 42 | 44 | 46 | 42 | 39 | 41 | 43 | 45 |
| 44 | 40 | 42 | 44 | 46 | 43 | 41 | 43 | 45 | 47 |
| 45 | 42 | 44 | 46 | 46 | 44 | 41 | 43 | 45 | 47 |
| 46 | 42 | 44 | 46 | 46 | 45 | 43 | 45 | 47 | 47 |
| 47 | 44 | 46 | 46 | 46 | 46 | 43 | 45 | 47 | 47 |
| | | | | | 47 | 45 | 47 | 47 | 47 |

FIG. 3

| Time | W L.N. | R L.N. | | | | | | | | GN L.N. |
|---|---|---|---|---|---|---|---|---|---|---|
| T0 | L0 | | | | | | | | | |
| T1 | L1 | | | | | | | | | |
| T2 | L2 | | | | | | | | | |
| T3 | L3 | | | | | | | | | |
| T4 | L4 | L0 | L1 | L2 | L3 | | | | | L0 |
| T5 | L5 | L0 | L1 | L2 | L3 | L4 | L5 | | | L1 |
| T6 | L6 | L0 | L1 | L2 | L3 | L4 | L5 | | | L2 |
| T7 | L7 | L0 | L1 | L2 | L3 | L4 | L5 | L6 | L7 | L3 |
| T8 | L8 | L0 | L1 | L2 | L3 | L4 | L5 | L6 | L7 | L4 |
| T9 | L9 | L2 | L3 | L4 | L5 | L6 | L7 | L8 | L9 | L5 |
| T10 | L10 | L2 | L3 | L4 | L5 | L6 | L7 | L8 | L9 | L6 |
| T11 | L11 | L4 | L5 | L6 | L7 | L8 | L9 | L10 | L11 | L7 |
| T12 | L12 | L4 | L5 | L6 | L7 | L8 | L9 | L10 | L11 | L8 |
| T13 | L13 | L6 | L7 | L8 | L9 | L10 | L11 | L12 | L13 | L9 |
| T14 | L14 | L6 | L7 | L8 | L9 | L10 | L11 | L12 | L13 | L10 |
| T15 | L15 | L8 | L9 | L10 | L11 | L12 | L13 | L14 | L15 | L11 |
| T16 | L16 | L8 | L9 | L10 | L11 | L12 | L13 | L14 | L15 | L12 |
| T17 | L17 | L10 | L11 | L12 | L13 | L14 | L15 | L16 | L17 | L13 |
| T18 | L18 | L10 | L11 | L12 | L13 | L14 | L15 | L16 | L17 | L14 |
| T19 | L19 | L12 | L13 | L14 | L15 | L16 | L17 | L18 | L19 | L15 |
| T20 | | L12 | L13 | L14 | L15 | L16 | L17 | L18 | L19 | L16 |
| T21 | | | | L14 | L15 | L16 | L17 | L18 | L19 | L17 |
| T22 | | | | L14 | L15 | L16 | L17 | L18 | L19 | L18 |
| T23 | | | | | | L16 | L17 | L18 | L19 | L19 |

FIG. 4

THREE-DIMENSIONAL (3D) IMAGE PROCESSING METHOD AND SYSTEM

CROSS-REFERENCES TO RELATED APPLICATIONS

This application claims the priority of Chinese patent application no. 201010230502.5 filed on Jul. 7, 2010, the entire contents of which are incorporated herein by reference.

FIELD OF THE INVENTION

The present invention relates to image processing and display technologies and, more particularly, to methods and systems for three-dimensional (3D) image processing and display.

BACKGROUND

When an image source transmits a three-dimensional (3D) image to a display device, usually two images are required to be transmitted separately. One is provided to be viewed by a viewer's left eye (left image); while the other is provided to be viewed by the viewer's right eye (right image). Through the parallax between the left eye and right eye, the viewer can perceive a 3D effect of the 3D image.

A variety of transmission formats may be used to transmit the left image and the right image from the image source (such as set-top box or computer, etc.) to the display device. One of the formats is an interlaced, or line-alternative, format. According to the interlaced format, in the 3D image, data of the left image and data of the right image are arranged in alternating lines. For example, the data of the left image is contained in lines 1, 3, 5, 7, . . . ; while the data of the right image is contained in lines 2, 4, 6, 8, . . . .

An existing two-dimensional (2D) image does not distinguish between any left image and right image, and only one 2D image is provided to be viewed by the viewer's both eyes. On the other hand, because the 3D image does distinguish between the left image and the right image, the amount of data of the 3D image is twice as much as that of the 2D image. However, to be compatible with the existing 2D image transmission formats and to use the existing 2D image transmission channels, the left and right images need to be compressed separately before being transmitted to the 3D image display device. After receiving the compressed left image and right image, the 3D image display device decompresses the left and right images, separately processes the left and right images, and displays the left image and the right image on the screen. Further, if a bicubic interpolation algorithm is used for decompression, four neighboring pixels need to be referred to determine the value of a new pixel. Thus, with the interlaced format, four lines of left image data and four lines of right image data are required separately to properly decompress the interlaced images.

The disclosed methods and systems are directed to solve one or more problems set forth above and other problems.

BRIEF SUMMARY OF THE DISCLOSURE

One aspect of the present disclosure includes a three-dimensional (3D) image processing method. The method includes receiving from an image source a 3D image containing compressed first image pixel data and compressed second image pixel data, and storing the received compressed first image pixel data and compressed second image pixel data in a line register group. The method also includes determining a relationship between lines of the compressed first image pixel data and compressed second image pixel data, and using reading and writing operations on the line register group based on the relationship and a predetermined timing sequence to decompress the compressed first image pixel data and compressed second image pixel data.

Another aspect of the present disclosure includes a 3D display system. The 3D display system includes a source image providing module, a line register group, and a microprocessing unit. The source image providing module is configured to provide a 3D image containing compressed first image pixel data and compressed second image pixel data. The line register group is configured to store the received compressed first image pixel data and compressed second image pixel data. Further, the microprocessing unit is configured to determine a relationship between lines of the compressed first image pixel data and compressed second image pixel data, and to use reading and writing operations on the line register group based on the relationship and a predetermined timing sequence to decompress the compressed first image pixel data and compressed second image pixel data.

Other aspects of the present disclosure can be understood by those skilled in the art in light of the description, the claims, and the drawings of the present disclosure.

BRIEF DESCRIPTION OF THE DRAWINGS

FIG. 3 illustrates an exemplary relationship table consistent with the disclosed embodiments; and FIG. 4 illustrates an exemplary time sequence consistent with the disclosed embodiments.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1A:
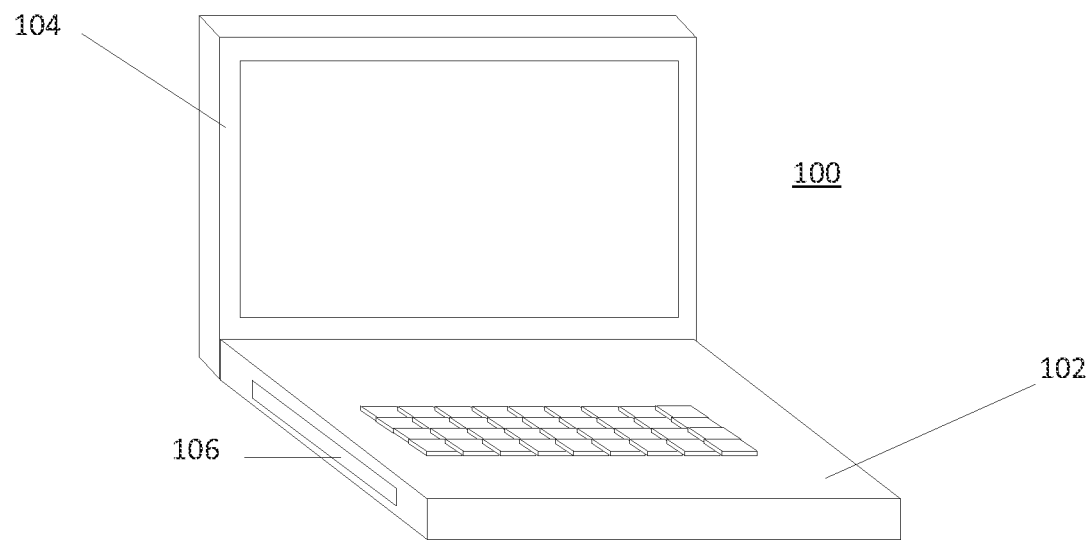
FIG. 1A shows an exemplary environment incorporating certain aspects of the invention.

FIG. 1A shows an exemplary environment incorporating certain aspects of the invention. As shown in FIG. 1, a three-dimensional (3D) display system 100 may include a base 102, a 3D display screen 104, and an information source 106. 3D display device 100 may include any appropriate device that capable of processing and displaying 3D video images, such as a computer, a television set, a smart phone, or a consumer electronic device. Although 3D display system 100 is shown as a notebook computer, any device with computing power may be included.

Base 102 may include any appropriate structures and components to support operations of 3D display system 100. 3D display screen 104 may include any appropriate display screen based on plasma display panel (PDP) display, cathode ray tube (CRT) display, liquid crystal display (LCD), organic light emitting diode (OLED) display, or other types of displays. 3D display screen 104 may also include any appropriate optical devices such as a lenticular lens screen or parallax barrier to facilitate 3D displays.

Further, information source 106 may include any appropriate source of information used by 3D display system 100, such as a DVD or CDROM device, a set top box, a digital receiver, a network adapter, a TV tuner, an information storage device, a hard disk or flash disk, or other media players.

Figure 1B:
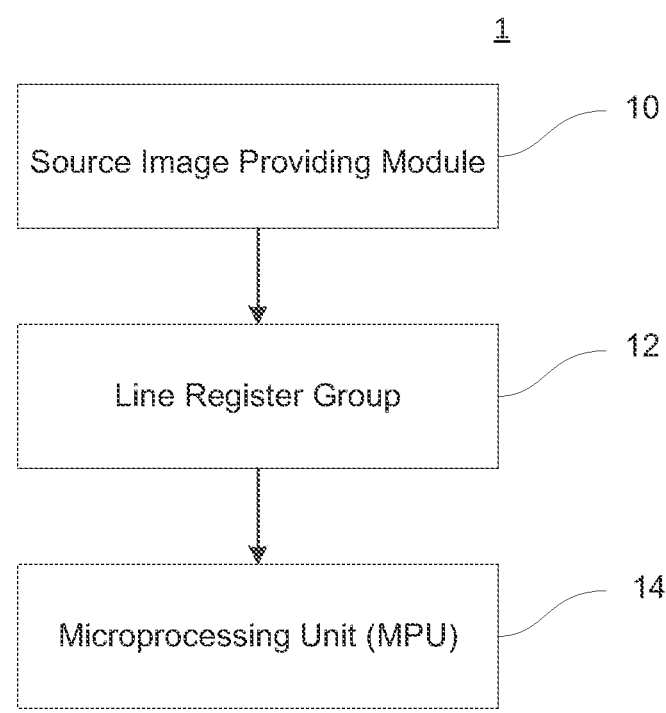
FIG. 1B illustrates an exemplary image processing unit consistent with the disclosed embodiments.

FIG. 1B illustrates an exemplary image processing unit 1 of 3D display system 100. As shown in FIG. 1B, image processing unit 1 includes a source image providing module 10, a line register group 12, and a microprocessing unit 14. Other components may also be included.

Source image providing module 10 may provide image processing unit 1 with a required left image and right image for processing. Further, the left image pixel data and the right image pixel data may be compressed for transmission. For example, a compression ratio of 2:1 may be applied to compress the left and right images.

Line register group 12 may be electrically coupled to source image providing module 10. Line register group 12 may include a plurality of line registers for receiving and caching or buffering the left image pixel data and the right image pixel data. The pixel data may then be used for decompression and/or other processing. A line register may include a number of buffer or memory elements to store data of a single line of pixels of the 3D image. To achieve the purpose of reducing data storage units, the total number of line registers of line register group 12 may be kept at minimum as to have a capacity necessarily required to correctly decompress the compressed left image and right image pixel data. For example, the number of the line registers in line register group 12 may be 8. However, any number of line registers may be used. In certain embodiments, the number of the line registers may be larger than 8 or may be 8m (m is a non-zero natural number).

Microprocessing unit 14 may be electrically coupled to line register group 12 and any other components to, for example, determine the left image pixel data and the right image pixel data, and to read pixel data from and write pixel data to line register group 12 according to a predetermined timing sequence. Microprocessing unit 14 may include any appropriate type of graphic processing unit (GPU), general purpose microprocessor, digital signal processor (DSP) or microcontroller, and application specific integrated circuit (ASIC). Further, microprocessing unit 14 may execute sequences of computer program instructions to perform various processes associated with 3D display system 100.

Figure 2:
FIG. 2 illustrates an exemplary buffering relationship consistent with the disclosed embodiments.

During operation, received image data (e.g., the left image pixel data and right image pixel data) is buffered into the line registers of line register group 12. FIG. 2 shows an exemplary buffering relationship consistent with the disclosed embodiments. As shown in FIG. 2, line register group 12 includes a total 8 line registers, from the first line register to the eighth line register, and pixel data may be stored in the 8 line registers according to a particular arrangement. Other number of line registers may also be used.

When storing a line of pixel data of the 3D image, the $8n^{th}$ line pixel data is stored or buffered in the first line register, the $(8n+1)^{th}$ line pixel data is stored in the second line register, the $(8n+2)^{th}$ line pixel data is stored in the third line register, the $(8n+3)^{th}$ line pixel data is stored in the fourth line register, the $(8n+4)^{th}$ line pixel data is stored in the fifth line register, the $(8n+5)^{th}$ line pixel data is stored in the sixth line register, the $(8n+6)^{th}$ line pixel data is stored in the seventh line register, and the $(8n+7)^{th}$ line pixel data is stored in the eighth line register, where n is 0, 1, 2, 3, 4, .... Even when the amount of data of a pixel data line is less than the capacity of the corresponding line register, the line of pixel data still uses the entire line register without sharing with other lines of pixel data.

Image processing unit 1 may decompress the received compressed pixel data. In certain embodiments, image processing unit 1 may decompress the pixel data based on a bicubic interpolation algorithm, which may require four neighboring lines as reference to decompress a line of pixel data. FIG. 3 shows an exemplary relationship table between a decompressed line of left image pixel and right image pixel to be generated and corresponding lines of original compressed pixel data received.

As shown in FIG. 3, the first column "Left L.N." represents the left image line number of the line of pixels of the left image to be generated (or decompressed), the second column "Reference Data Original L.N." represents the reference data of lines of pixels in the original received 3D image that are required to decompress the corresponding left image line. Further, the third column "Right L.N." represents the right image line number of the line of pixels of the right image to be generated (or decompressed), the fourth column "Reference Data Original L.N." represents the reference data of lines of pixels in the original received 3D image that are required to decompress the corresponding right image line. Further, the required original image pixel data in even-numbered lines 0, 2, 4, 6, 8, etc. are transmission of the left image, and the required original image pixel data in odd-numbered lines 1, 3, 5, 7, 9, etc. are transmission of the right image.

For example, when using the bicubic interpolation decompression algorithm to generate a decompressed image, as shown in FIG. 3, the $10^{th}$ line of the left image is generated from the $6^{th}$, $8^{th}$, $10^{th}$, and $12^{th}$ lines of the original 3D image pixel data, and the $10^{th}$ line of the right image is generated from the $7^{th}$, $9^{th}$, $11^{th}$ and $13^{th}$ lines of the original 3D image pixel data.

Further, image processing unit 1 may read four lines of original compressed data of the left image and four lines of original compressed data of the right image at the same time. A certain timing sequence may be used by image processing unit 1 to perform a series of read and write operations based on line register group 12. FIG. 4 shows an exemplary time sequence consistent with the disclosed embodiments.

As shown in FIG. 4, the first column "Time" represents a timing sequence of a series of units of time (i.e., time slots) arranged in chronological order from top to bottom, the second column "W L.N." represents the line number of pixel data to be written into the line registers of line register group 12, the third column "R L.N." represents the line numbers of pixel data to be read out of the line registers, and the fourth column "GN L.N." represents the line number of decompressed pixel data to be generated based on the pixel data read out of the line registers. Although a total of 20 lines (L0 to L19) are used for illustration, any number of lines may be used. Further, although the line number is listed in sequence, the relationship between a particular line of pixel data and a particular line register (as shown in FIG. 2) determines the corresponding registers to be read from and written into in a certain time slot. Thus, the processes of receiving compressed pixel data, writing the compressed data into the line registers, reading the data out of the line registers, and decompressing the compressed pixel data are performed in a pipe-lined way based on the timing sequence and the line registers.

When reading pixel data for decompression, image processing unit 1 may use one of the following two ways. One way is to read all pixel data (i.e., 8 lines of pixel data) from line register group 12. For example, as shown in FIG. 4, at timing sequence T10, the decompressed pixel data to be generated is line L6 (the $7^{th}$ line), the compressed pixel data to be written to line register group 12 is line L10 of the left image, and pixel data required for decompression is from the lines L2 to L9. Therefore, all pixel data lines L2 to L9 are read from line register group 12 for decompression. That is, when the decompressed pixel data line is odd-numbered, all pixel data lines required for decompression are read from line register group 12.

The other way is to read seven of the eight pixel data lines from line register group 12, and the one remaining pixel data line from current received pixel data to improve pipe-line efficiency. For example, as shown in FIG. 4, at timing sequence T11, the decompressed pixel data to be generated is line L7 (the $8^{th}$ line), and pixel data required for decompression is from the lines L4 to L11. However, in this time slot, line register group 12 is receiving the compressed data for right image line L11, while the original pixel data of lines L4 to L10 is already in line register group 12. Thus, pixel data of lines L4 to L10 are read from line register group 12, and the remaining line L11 is read directly from the current received pixel data to improve efficiency. That is, when the decompressed pixel data line is even-numbered, all pixel data lines except one for decompression are read from line register group 12 and the remaining pixel data line is read from the current received pixel data.

In addition, during data processing, the number of lines of left image data and the number of lines of right image data might not be the same. For example, the left image data may have one more line than the right image data, or the right image data may have one more line than the left image data. Image processing unit 1 may correct this problem to avoid sudden changes in decompressed images caused by data errors. A sudden change, as used herein, may refer to certain R, G, and/or B pixel value changes directly from small to large or from large to small. For example, when the difference between the left image data and the right image data is small, image processing unit 1 may copy the last pixel data line of the 3D image to the left image or the right image with one less line, then decompress the copied data separately. Or, when there is no sudden changes in the image with one less line, image processing unit 1 may copy the last line of pixel data in the left image or the right image with one less line as the next line of data, and then decompress the respective image.

By setting a reasonable-size line register as the smallest data unit in a data buffer unit and with certain read and write timing sequence, the disclosed embodiments may reduce the amount of pixel data storage, improve data processing efficiency, reduce the size of required data storage unit, and lower design and manufacturing cost.

What is claimed is:

1. A three-dimensional (3D) image processing method, comprising:
   receiving from an image source a 3D image containing compressed first image pixel data and compressed second image pixel data;
   storing the received compressed first image pixel data and compressed second image pixel data in a line register group;
   determining a relationship between lines of the compressed first image pixel data and compressed second image pixel data; and
   using reading and writing operations on the line register group based on the relationship and a predetermined timing sequence to decompress the compressed first image pixel data and compressed second image pixel data,
   wherein:
   the line register group includes a plurality of line registers;
   when a decompressed pixel data line is even-numbered, all but one pixel data lines for decompressing the compressed first image and second image are read from the line register group; and
   remaining one pixel data line is read from currently received pixel data.

2. The method according to claim 1, wherein each of the plurality of line registers stores a line of pixel data of the 3D image.

3. The method according to claim 1, wherein
   a pixel data line of the compressed first image is decompressed based on four neighboring lines of the compressed first image;
   a pixel data line of the compressed second image is decompressed based on four neighboring lines of the compressed second image; and
   pixel data lines of the compressed first image and the compressed second image are interlaced.

4. The method according to claim 2, wherein:
   when an amount of data of a pixel data line is less than a capacity of a corresponding line register, the pixel data line uses the line register entirely without sharing with other pixel data lines.

5. The method according to claim 1, wherein:
   when a decompressed pixel data line is odd-numbered, all pixel data lines required for decompressing the compressed first image and second image are read from the line register group.

6. The method according to claim 1, wherein
   when a decompressed pixel data line is even-numbered, seven pixel data lines for decompressing the compressed first image and second image are read from the line register group.

7. The method according to claim 1, further including:
   when a total number of lines of left image and a total number of lines of right image data differ one line, and a difference between the left image data and the right image data is small, copying a last pixel data line of the 3D image to the left image or the right image with one less line.

8. The method according to claim 1, further including:
   when a total number of lines of left image and a total number of lines of right image data differ one line, and no sudden change in the left or right image with one less line, copying a last line of pixel data in the left or right image with one less line as the next line of pixel data of the left or right image with one less line.

9. The method according to claim 1, wherein
   the plurality of line registers include a total of eight (8) or more line registers.

10. A three-dimensional (3D) display system, comprising:
   a source image providing module configured to provide a 3D image containing compressed first image pixel data and compressed second image pixel data;
   a line register group configured to store the received compressed first image pixel data and compressed second image pixel data; and
   a microprocessing unit configured to
      determine a relationship between lines of the compressed first image pixel data and compressed second image pixel data; and
      use reading and writing operations on the line register group based on the relationship and a predetermined timing sequence to decompress the compressed first image pixel data and compressed second image pixel data,
   wherein:
      the line register group is further configured to include a plurality of line registers; and the microprocessing unit is further configured to, when a decompressed pixel data line is even-numbered, read all but one pixel data lines for decompressing the compressed first image and second image from the line register group and to read remaining one pixel data line from currently received pixel data.

11. The 3D display system according to claim 10, wherein each of the plurality of line registers stores a line of pixel data of the 3D image.

12. The 3D display system according to claim 10, wherein pixel data lines of the compressed first image and the compressed second image are interlaced, and the microprocessing unit is further configured to:
   decompress a pixel data line of the compressed first image based on four neighboring lines of the compressed first image; and
   decompress a pixel data line of the compressed second image based on four neighboring lines of the compressed second image.

13. The 3D display system according to claim 10, wherein:
   when an amount of data of a pixel data line is less than a capacity of a corresponding line register, the pixel data line uses the line register entirely without sharing with other pixel data lines.

14. The 3D display system according to claim 10, wherein the microprocessing unit is further configured to:
   when a decompressed pixel data line is odd-numbered, read all pixel data lines required for decompressing the compressed first image and second image from the line register group.

15. The 3D display system according to claim 10, wherein the microprocessing unit is further configured to:
   when a decompressed pixel data line is even-numbered, read seven pixel data lines for decompressing the compressed first image and second image from the line register group.

16. The 3D display system according to claim 10, wherein the microprocessing unit is further configured to:
   when a total number of lines of left image and a total number of lines of right image data differ one line, and a difference between the left image data and the right image data is small, copy a last pixel data line of the 3D image to the left image or the right image with one less line.

17. The 3D display system according to claim 10, wherein the microprocessing unit is further configured to:
   when a total number of lines of left image and a total number of lines of right image data differ one line, and no sudden change in the left or right image with one less line, copy a last line of pixel data in the left or right image with one less line as the next line of pixel data of the left or right image with one less line.

18. The 3D display system according to claim 10, wherein the plurality of line registers include a total of eight (8) or more line registers.

* * * * *